(12) United States Patent
Tan et al.

(10) Patent No.: US 12,069,068 B2
(45) Date of Patent: Aug. 20, 2024

(54) METHOD AND DEVICE FOR DETECTING COMPROMISE OF A TARGET BY A SIDE ATTACK

(71) Applicant: WALLIX, Saint-Honoré (FR)

(72) Inventors: Meng Tan, Montrouge (FR); Serge Adda, Antony (FR)

(73) Assignee: WALLIX, Saint-Honoré (FR)

( * ) Notice: Subject to any disclaimer, the term of this patent is extended or adjusted under 35 U.S.C. 154(b) by 403 days.

(21) Appl. No.: 17/259,515

(22) PCT Filed: Jun. 24, 2019

(86) PCT No.: PCT/FR2019/051544
§ 371 (c)(1),
(2) Date: Jan. 11, 2021

(87) PCT Pub. No.: WO2020/012083
PCT Pub. Date: Jan. 16, 2020

(65) Prior Publication Data
US 2021/0329017 A1     Oct. 21, 2021

(30) Foreign Application Priority Data
Jul. 11, 2018  (FR) ...................................... 1856373

(51) Int. Cl.
*H04L 9/40* (2022.01)
*H04L 9/32* (2006.01)

(52) U.S. Cl.
CPC ........ *H04L 63/1416* (2013.01); *H04L 9/3247* (2013.01); *H04L 63/102* (2013.01); *H04L 63/145* (2013.01)

(58) Field of Classification Search
USPC ..................................................... 726/22–25
See application file for complete search history.

(56) References Cited

U.S. PATENT DOCUMENTS 6,292,790 B1 *  9/2001  Krahn ................. G06F 21/6209
                                                                    705/50
6,874,088 B1 *  3/2005  Stevens ............... H04L 63/0471
                                                                    713/153

(Continued)

OTHER PUBLICATIONS

Mochamad et al.; Intrusion detection against unauthorized file modification by integrity checking and recovery with HW/SW platforms using programmable system-on-chip (SOC); ICOIACT 2018 (Year: 2018).*

(Continued)

*Primary Examiner* — Kambiz Zand
*Assistant Examiner* — Mahabub S Ahmed
(74) *Attorney, Agent, or Firm* — TraskBritt

(57) ABSTRACT

A method for detecting a side attack of a target by a user comprising a step of recording data relating to a so-called sensitive file, the sensitive file being a configuration file of the target; a step of primary connection of the user on a proxy gateway to establish a secondary connection of the proxy gateway on the target; a step of verification of the integrity of the sensitive file, subsequently to the step of secondary connection of the proxy gateway on the target and when the integrity of the sensitive file is determined as compromised by the step of verification of the integrity of the sensitive file, and a step of detection of a side attack of the target by the user.

17 Claims, 2 Drawing Sheets

(56) References Cited

U.S. PATENT DOCUMENTS

| | | | | | |
|---|---|---|---|---|---|
| 7,735,116 | B1* | 6/2010 | Gauvin | | H04L 63/102 713/153 |
| 7,886,048 | B1* | 2/2011 | Holland | | H04L 67/535 709/224 |
| 8,327,128 | B1* | 12/2012 | Prince | | H04L 63/0884 713/153 |
| 8,799,641 | B1* | 8/2014 | Seidenberg | | H04L 63/0281 713/168 |
| 9,386,019 | B1* | 7/2016 | Barak | | H04L 63/083 |
| 9,483,644 | B1* | 11/2016 | Paithane | | G06F 16/128 |
| 10,205,733 | B1* | 2/2019 | Park | | H04L 63/18 |
| 10,503,904 | B1* | 12/2019 | Singh | | G06F 21/566 |
| 10,929,423 | B1* | 2/2021 | Patwardhan | | G06F 11/1484 |
| 11,216,559 | B1* | 1/2022 | Gu | | G06F 21/564 |
| 11,425,151 | B2* | 8/2022 | Kaidi | | G06F 21/554 |
| 2002/0095591 | A1* | 7/2002 | Daniell | | G06F 21/55 726/26 |
| 2003/0079158 | A1* | 4/2003 | Tower | | G06F 21/52 714/E11.123 |
| 2003/0179714 | A1* | 9/2003 | Gilgenbach | | H04L 9/40 370/252 |
| 2004/0034794 | A1* | 2/2004 | Mayer | | G06F 21/567 709/224 |
| 2005/0033777 | A1* | 2/2005 | Moraes | | G06F 16/275 |
| 2005/0039040 | A1* | 2/2005 | Ransom | | H04L 63/0272 700/286 |
| 2005/0166041 | A1* | 7/2005 | Brown | | H04L 63/0823 713/150 |
| 2007/0050294 | A1* | 3/2007 | Trottier | | H04L 9/0891 705/50 |
| 2007/0265967 | A1* | 11/2007 | Kahn | | H04N 21/4627 348/E7.06 |
| 2008/0104672 | A1* | 5/2008 | Lunde | | H04L 63/1441 726/3 |
| 2008/0127338 | A1* | 5/2008 | Cho | | G06F 21/566 726/22 |
| 2009/0172816 | A1* | 7/2009 | Maino | | G06F 21/566 726/24 |
| 2009/0199289 | A1* | 8/2009 | Davis | | H04L 63/168 726/12 |
| 2009/0322510 | A1* | 12/2009 | Berger | | H04W 60/00 340/568.1 |
| 2010/0098243 | A1* | 4/2010 | Chopart | | G06F 21/31 726/30 |
| 2010/0229219 | A1* | 9/2010 | Mendonca | | H04L 9/3271 726/4 |
| 2011/0078497 | A1* | 3/2011 | Lyne | | G06F 11/1469 714/15 |
| 2011/0110364 | A1* | 5/2011 | Fried | | G06Q 30/02 370/352 |
| 2011/0138465 | A1* | 6/2011 | Franklin | | G06F 21/564 726/23 |
| 2011/0246317 | A1* | 10/2011 | Coppinger | | H04L 67/306 705/17 |
| 2013/0067574 | A1* | 3/2013 | Brueckner | | H04L 63/1416 726/23 |
| 2014/0020072 | A1* | 1/2014 | Thomas | | H04L 67/10 726/7 |
| 2014/0082719 | A1* | 3/2014 | Persson | | H04L 12/462 726/15 |
| 2014/0366155 | A1* | 12/2014 | Chang | | G06F 9/45558 726/27 |
| 2015/0047032 | A1* | 2/2015 | Hannis | | H04L 63/1491 726/23 |
| 2015/0186643 | A1* | 7/2015 | Tu | | G06F 21/53 726/23 |
| 2016/0248590 | A1* | 8/2016 | Benson | | H04W 12/12 |
| 2016/0330230 | A1* | 11/2016 | Reddy | | H04L 63/166 |
| 2017/0078922 | A1* | 3/2017 | Raleigh | | H04L 69/18 |
| 2017/0149781 | A1* | 5/2017 | Tubi | | H04L 61/4511 |
| 2017/0161071 | A1* | 6/2017 | Pierson | | G06F 9/30185 |
| 2017/0359317 | A1* | 12/2017 | Anderson | | G06F 21/602 |
| 2018/0018673 | A1* | 1/2018 | Muchsel | | G06Q 20/382 |
| 2018/0198807 | A1* | 7/2018 | Johns | | H04L 63/1425 |
| 2018/0211039 | A1* | 7/2018 | Tamir | | G06F 21/568 |
| 2018/0212987 | A1* | 7/2018 | Tamir | | G06F 11/1461 |
| 2018/0248896 | A1* | 8/2018 | Challita | | G06F 21/554 |
| 2019/0103341 | A1* | 4/2019 | Bedhapudi | | G06F 16/1752 |
| 2019/0188380 | A1* | 6/2019 | Animireddygari | ... | G06F 21/568 |
| 2019/0228147 | A1* | 7/2019 | Formato | | H04L 63/145 |
| 2019/0286534 | A1* | 9/2019 | O'Mahony | | G06F 21/565 |
| 2020/0053072 | A1* | 2/2020 | Glozman | | H04W 12/08 |
| 2020/0389469 | A1* | 12/2020 | Litichever | | H04W 4/40 |

OTHER PUBLICATIONS

Kaczmarek, et al.; Modern Approaches to File System Integrity Checking; Proceedings of the 2008 1st International Conference (Year: 2008).*

Mukherjee, et al.; Network Intrusion Detection; IEEE (Year: 1994).*

Kim et al.; The Design and Implementation of Tripwire: A File System Integrity Checker; ACM (Year: 1994).*

Petri, Daniel, Secure Remote Access—Configuring and Session Recording, https://www.petri.com/creating-secure-auditable-remote-access-management-environment-windows-server security, retrieved <ay 8, 2019.

Donovan, Kevin, 10 Ways ObserveIT Goes Beyond Session Recording, https:/ /www.observeit.com!blog/ 1 0-ways-observei t-goes-beyond-session-recording/, retrieved May 9, 2017.

Huang et al., Proxy-Based Security Audit System for Remote Desktop Access, Computer Communications and Networks, (2009), Proceedings of 18th International Conference on IEEE, Aug. 3, 2009.

International Search Report for International Application No. PCT/FR2019/051544 dated Oct. 8, 2019, 4 pages.

International Written Opinion for International Application No. PCT/FR2019/051544 dated Oct. 8, 2019, 6 pages.

Donovan et al., "10 Ways ObserveIT Goes Beyond Session Recording", 2017, XP002791129.

European Communication pursuant to Article 94(3) EPC for European Application No. 19745708, dated May 12, 2022, 5 pages.

Petri et al., "Secure Remote Access—Configuring and Session Recording", 2009, XP002791128.

\* cited by examiner

METHOD AND DEVICE FOR DETECTING COMPROMISE OF A TARGET BY A SIDE ATTACK

CROSS-REFERENCE TO RELATED APPLICATIONS

This application is a national phase entry under 35 U.S.C. § 371 of International Patent Application PCT/FR2019/051544, filed Jun. 24, 2019, designating the United States of America and published as International Patent Publication WO 2020/012083 A1 on Jan. 16, 2020, which claims the benefit under Article 8 of the Patent Cooperation Treaty to French Patent Application Serial No. 1856373, filed Jul. 11, 2018.

TECHNICAL FIELD

The present disclosure lies in the field of displaying a graphic object generated by a remote server on a display device of a local terminal. More specifically, the present disclosure applies to a local terminal and a remote server implementing a remote desktop protocol, in the context of a session controlled by a proxy gateway. It applies, in particular, to the remote desktop protocol known under the name of RDP, for Remote Desktop Protocol, or even to the SSH protocol, for Secure SHell.

BACKGROUND

In particular, a secure authentication system and method based on a proxy gateway are known in the state of the art, facilitating the improvement of the security of an authentication between a client and a target by means of an authentication module on a proxy gateway. The client can connect to the proxy gateway using a native protocol and provides user credentials to the proxy gateway.

There is no need for the user to be in possession of the target access credentials. The proxy gateway can optionally be connected to a privileged access management system that can provide and/or store target access credentials. The target access credentials provided by the proxy gateway help prevent a breach in client security that exposes the target access credentials.

However, in order to render a service to a user, a connection to the target with privileged access may be necessary. Of course, the target can then be exposed to a side security attack, by creating a privileged account on behalf of the user.

There is therefore a need to better secure the targets that can be attacked by side security attacks.

BRIEF SUMMARY

One aim of the present disclosure is, in particular, to address all or part of the aforementioned drawbacks.

An idea that is the basis of the present disclosure is to ensure the integrity over time of various configuration files of the target.

To this end, there is proposed, according to a first aspect of the present disclosure, a method for detecting a side attack on a target by a user comprising:

a step of recording data relating to one or more so-called sensitive files, the sensitive files being configuration files of the target, a step of primary connection of the user on a proxy gateway to establish a secondary connection of the proxy gateway on the target, a step of verification of the integrity of the sensitive files, subsequently to the step of secondary connection of the proxy gateway on the target, and when the integrity of at least one sensitive file is determined as compromised by the step of verification of the integrity of the sensitive file, a step of detection of a side attack of the target by the user.

Therefore, a side attack cannot succeed because it is detected and an adequate response can be provided.

The data that are recorded relative to the sensitive files can be recorded on the proxy gateway.

Advantageously, the method according to the present disclosure can include a step of copying the sensitive file into a so-called intact file, prior to the secondary connection step.

According to a first possibility, when a side attack of the target by the user is detected, the sensitive files are modified to be replaced by intact files.

According to a second possibility, which may possibly be combined with the first, when a possibility of side attack of the target by the user is detected, a notification (by email or SMS) is sent to an administrator of the proxy gateway and/or of the target. Preferably, the user connected to the target is not informed of this notification.

The step of verifying the integrity of the sensitive files may include a step of comparing so-called current data relating to the sensitive file, which are determined from the so-called current sensitive file, and recorded data relating to the sensitive file.

According to a first embodiment, the recorded data relating to the sensitive file include the sensitive file itself. It is therefore possible to check the contents of the file against an intact file.

According to a second embodiment, the recorded data relating to the sensitive files can include attributes of the sensitive files. These attributes are, for example, the size, the owner, the i-node and the date of the file. It is therefore possible to check only the recorded attributes against the attributes of an intact file.

According to a third embodiment, the recorded data relating to the sensitive file include a digital signature of the sensitive file. It is therefore possible to check only the recorded signature against that of an intact file.

According to one possibility, the step of recording data relating to sensitive files is carried out subsequently to the user's primary connection step and prior to the step of verifying the integrity of the sensitive files.

The step of recording data relative to the sensitive file can be performed immediately after the secondary connection step and before a user-generated command can be executed by the target. It is therefore possible to know the state of the sensitive files prior to any action by the user on the sensitive files.

By way of example, the step of verifying the integrity of the sensitive file can be carried out by the proxy gateway, subsequently to a step of downloading so-called current data, relating to the so-called current sensitive file, on the proxy gateway.

Still by way of example, the step of verifying the integrity of the sensitive file can be performed by the target.

According to one embodiment, the sensitive files are generated by calls to programming interfaces, API for application programming interface in the case of Windows systems. These calls can be made through a session probe deployed on the target at the start of the connection.

The method according to the claim may advantageously include a step of closing the secondary connection, in which case the step of verifying the integrity of the sensitive file is carried out prior to the step of closing the secondary connection.

According to a second aspect of the present disclosure, a proxy gateway is proposed for the detection of a side attack of a target by a user, comprising data processing means configured to:

record data relating to a so-called sensitive file, the sensitive file being a target configuration file, establish a primary connection of the user on the proxy gateway to establish a secondary connection of the proxy gateway on the target, verify the integrity of the sensitive file, subsequently to the step of secondary connection of the proxy gateway on the target, and when the integrity of the sensitive file is determined as compromised by the step of verification of the integrity of the sensitive file, detect a side attack of the target by the user.

According to another aspect of the present disclosure, there is provided a computer program product, downloadable from a communication network and/or stored on a computer-readable medium and/or executable by a microprocessor, and loadable in an internal memory of a calculation unit, comprising program code instructions, which when executed by the calculation unit, implement the steps of a method according to the first aspect of the present disclosure, or one or several of its improvements.

BRIEF DESCRIPTION OF THE DRAWINGS

Other advantages and particularities of the present disclosure will become apparent on reading the detailed description of implementations and embodiments, which are in no way limiting, with regard to the accompanying drawings in which.

DETAILED DESCRIPTION

Since the embodiments described hereinafter are not limiting in nature, it is possible, in particular, to consider variants of the present disclosure that comprise only a selection of the features that are described, provided that this selection of features is sufficient to confer a technical advantage or to differentiate the present disclosure from the prior art. This selection comprises at least one preferably functional feature without structural details, or with only a portion of the structural details if this part alone is sufficient to confer a technical advantage or to differentiate the present disclosure from the prior art.

Figure 1:
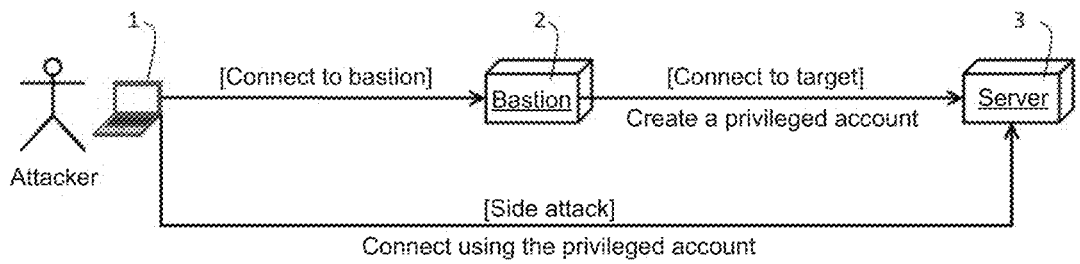
FIG. 1 schematically shows a side attack of a target according to the prior art.

FIG. 1 schematically shows a side attack of a target according to the prior art.

An attacker A has established a legitimate connection between a terminal 1 and a proxy gateway 2, also called a "bastion." As a result of this legitimate connection, the bastion establishes a legitimate connection between itself and a server 3.

Thereafter, the attacker modifies one or more files on the server 3 in order to establish later, and without going through the bastion, a connection by a privileged account between the attacker and the server.

Figure 2:
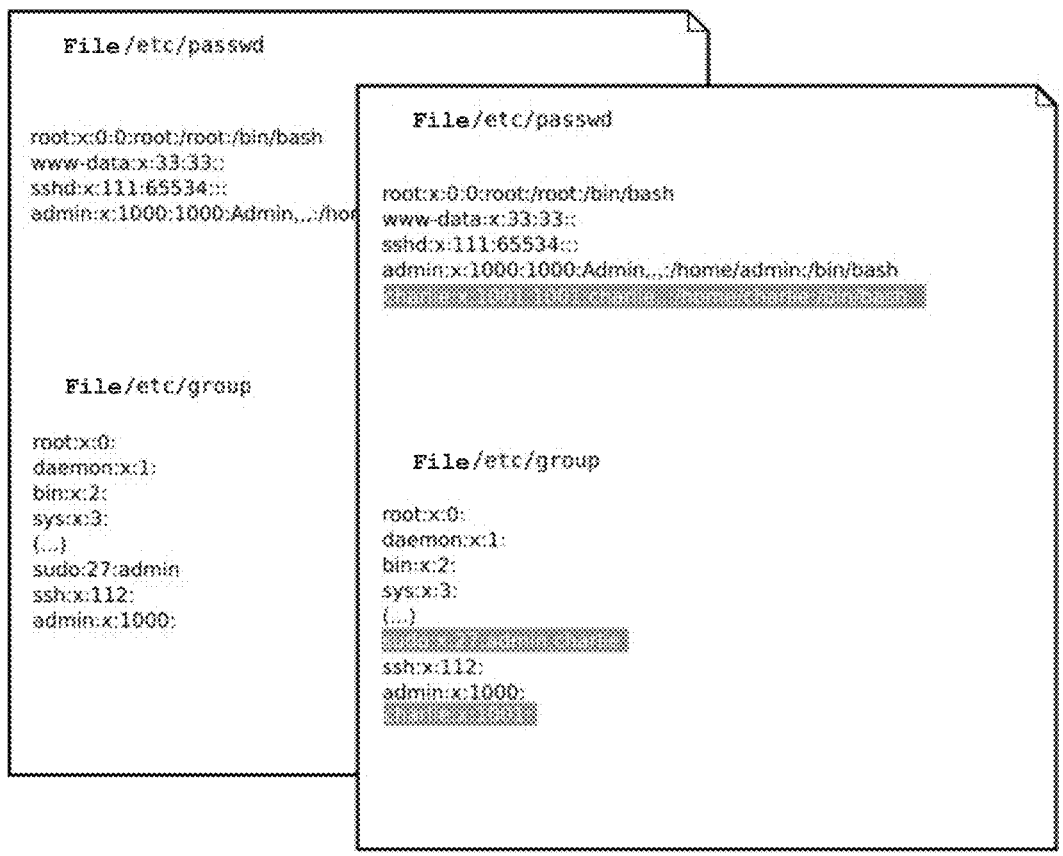
FIG. 2 illustrates the content of two files of a target, before and after the attacker's connection to the target via a proxy gateway.

This is illustrated by FIG. 2, which lists the content of two files on the server, before and after the attacker connects to server 3 via the proxy gateway 2.

After the attacker logs in, the file named "/etc/passwd" includes an additional line accrediting a new user "charlie" and a new group "1001." The user "charlie" has also been added to the list of the group "sudo," in the file "/etc/group." Therefore, after the side attack, the user "charlie" can connect directly to server 3 and perform actions with administrator permissions.

Figure 3:
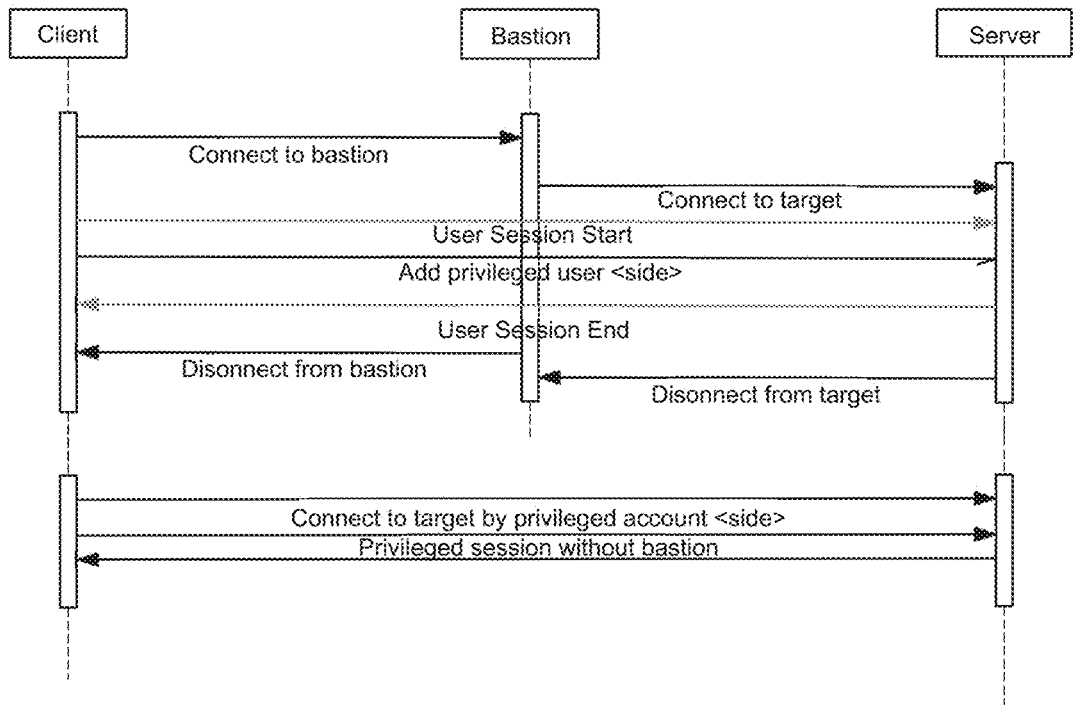
FIG. 3 illustrates a data exchange diagram to achieve the creation of the privileged user of FIG. 2.

FIG. 3 illustrates a data exchange diagram to achieve the creation of the privileged user of FIG. 2.

Figure 4:
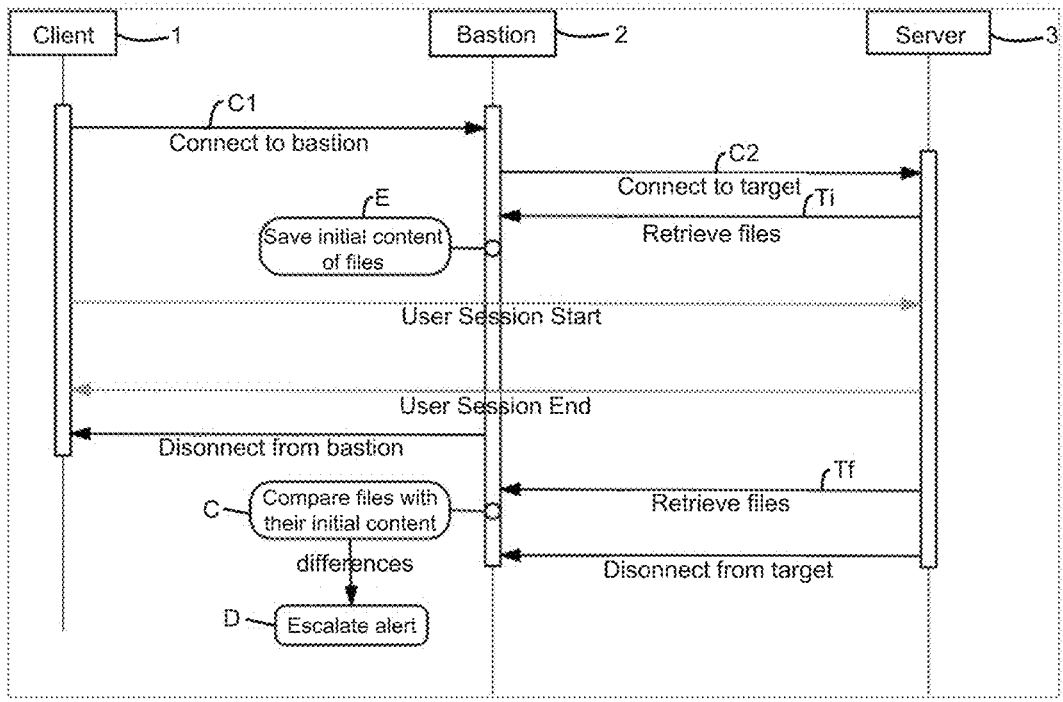
FIG. 4 illustrates a data exchange diagram deriving from the implementation of a method according to a first embodiment of the present disclosure.

According to an embodiment of a method according to the present disclosure leading to the data exchange diagram illustrated by FIG. 4, the method also comprises a step of primary connection C1 of the user on a proxy gateway 2 to establish a secondary connection C2 of the proxy gateway 2 on the target server 3.

The method includes:

a step of initial downloading Ti of data relating to a so-called sensitive file, the sensitive file being a configuration file of the target server 3, and a recording step E of the data downloaded on the proxy gateway 2, subsequently at the end of a user session, a final download step Tf of data relating to the current sensitive file on the target server 3, a step of verifying C the integrity of the sensitive file, subsequently to the step of secondary connection of the proxy gateway to the target, and when the integrity of the sensitive file is determined as compromised by the step of verifying the integrity of the sensitive file, a step of detecting D a side attack of the target by the user. The detection step D according to the embodiment comprises an alert escalation to an administrator of the target server 3.

Of course, the present disclosure is not limited to the examples that have just been described, and numerous modifications can be made to these examples without departing from the scope of the present disclosure. In addition, the various features, forms, variants and embodiments of the present disclosure can be associated with each other in various combinations as long as they are not incompatible or mutually exclusive.

The invention claimed is:

1. A method for detecting a side attack on a target by a user, the method comprising:

establishing a primary connection between the user and a proxy gateway and establishing a secondary connection between the proxy gateway and the target;

obtaining first data relating to at least part of a sensitive file before a user session is initiated between the user and the target, the sensitive file being a target configuration file;

obtaining second data relating to at least part of the sensitive file responsive to termination of a user session between the user and the target;

verifying integrity of the sensitive file by comparing the first data to the second data; and detecting a side attack of the target by the user responsive to determining that at least part of the first data is different from at least part of the second data.

2. The method of claim 1, further comprising a step of copying the sensitive file into an intact file, prior to establishing the secondary connection.

3. The method of claim 2, wherein, when a side attack of the target by the user is detected, the sensitive file is replaced by the intact file.

4. The method of claim 3, wherein a notification is sent to an administrator of the proxy gateway and/or of the target when a side attack of the target by the user is detected.

5. The method of claim 1, wherein the first data includes a copy of an entirety of the sensitive file.

6. The method of claim 5, wherein the first data includes attributes of the sensitive file.

7. The method of claim 6, wherein the first data includes a digital signature based, at least partially, on the sensitive file.

8. The method of claim 1, wherein obtaining the first data is carried out subsequently to establishing the user's primary connection and prior to verifying the integrity of the sensitive file.

9. The method of claim 8, wherein obtaining the first data is carried out immediately after establishing the secondary connection.

10. The method of claim 1, further comprising closing the secondary connection, and wherein verifying the integrity of the sensitive file is carried out prior to closing the secondary connection.

11. The method of claim 1, further comprising downloading and storing the second data on the proxy gateway, and wherein the step of verifying the integrity of the sensitive file is carried out by the proxy gateway responsive to downloading and storing the second data.

12. A proxy gateway for detecting a side attack of a target by a user, comprising data processing circuitry configured to:

establish a primary connection between the user and the proxy gateway to establish a secondary connection of between the proxy gateway and the target;

obtain first data of at least part of a sensitive file before a user session is initiated between the user and the target, the sensitive file being a target configuration file;

obtain second data of at least part of the sensitive file responsive to a termination of the secondary connection between the user and the proxy gateway;

verify integrity of the sensitive file by comparing the first data to the second data; and detect a side attack of the target by the user responsive to determining that at least part of the first data is different from at least part of the second data.

13. A computer program product, downloadable from a communication network and/or stored on a non-transitory computer-readable medium and/or executable by a microprocessor, and loadable in an internal memory of a computer, wherein the computer program product comprises program code instructions, which, when executed by a calculation unit, implement the steps of a method according to claim 1.

14. The method of claim 1, wherein a notification is sent to an administrator of the proxy gateway and/or of the target when a side attack of the target by the user is detected.

15. The proxy gateway of claim 12, wherein the first data includes a copy of an entirety of the sensitive file.

16. The proxy gateway of claim 12, wherein the first data relating to the sensitive file includes attributes of the sensitive file.

17. The method of claim 1, wherein the first data relating to the sensitive file includes a digital signature based, at least in part, on the sensitive file.

* * * * *

UNITED STATES PATENT AND TRADEMARK OFFICE
CERTIFICATE OF CORRECTION

PATENT NO. : 12,069,068 B2
APPLICATION NO. : 17/259515
DATED : August 20, 2024
INVENTOR(S) : Meng Tan and Serge Adda It is certified that error appears in the above-identified patent and that said Letters Patent is hereby corrected as shown below:

On the Title Page
In Item (57) ABSTRACT, Line 9, change "sensitive tile is" to --sensitive file is--

In the Claims
CLAIMS HEADING, Column 4, Line 55, change "The invention claimed is:" to --What is claimed is:--

Claim 12, Column 6, Lines 5-6, change "secondary connection of between the" to --secondary connection between the--

Signed and Sealed this
Nineteenth Day of November, 2024

Katherine Kelly Vidal
*Director of the United States Patent and Trademark Office*